US012649196B2

(12) United States Patent
Ang et al.

(10) Patent No.: US 12,649,196 B2
(45) Date of Patent: Jun. 9, 2026

(54) ALIGNMENT TOOL FOR A SOLDER MACHINE

(71) Applicant: Sandisk Technologies, Inc., Milpitas, CA (US)

(72) Inventors: Ching Yoong Ang, Bukit Mertajam (MY); Kar Foong Yong, Bukit Mertajam (MY); Mohamad Fikri Mohd Sharif, Nibong Tebal (MY)

(73) Assignee: Sandisk Technologies, Inc., Milpitas, CA (US)

( * ) Notice: Subject to any disclaimer, the term of this patent is extended or adjusted under 35 U.S.C. 154(b) by 404 days.

(21) Appl. No.: 18/480,724

(22) Filed: Oct. 4, 2023

(65) Prior Publication Data

US 2025/0144729 A1     May 8, 2025

(51) Int. Cl.
B23K 3/06          (2006.01)

(52) U.S. Cl.
CPC .................................... B23K 3/063 (2013.01)

(58) Field of Classification Search
CPC ..... B23K 3/063; B23K 1/0016; B23K 1/0056
See application file for complete search history.

(56) References Cited

U.S. PATENT DOCUMENTS

| | | | | |
|---|---|---|---|---|
| 713,665 A | * | 11/1902 | Morse .................. | B23K 9/0286 |
| | | | | 228/29 |
| 1,745,252 A | * | 1/1930 | Ginter ...................... | G01B 3/56 |
| | | | | 33/387 |
| 3,845,538 A | * | 11/1974 | Demler, Sr. ............. | B25B 27/16 |
| | | | | 81/421 |
| 6,603,093 B2 | * | 8/2003 | Epitaux .................. | B23K 26/22 |
| | | | | 219/121.64 |
| 8,091,757 B1 | * | 1/2012 | Stawarski .............. | B23K 3/063 |
| | | | | 228/49.1 |
| 8,893,396 B2 | * | 11/2014 | Gamon ................ | G01C 15/004 |
| | | | | 33/529 |
| 11,936,153 B2 | * | 3/2024 | McCommons ........ | B23K 3/087 |

* cited by examiner

*Primary Examiner* — Kristina M Deherrera
*Assistant Examiner* — Tania Courson
(74) *Attorney, Agent, or Firm* — DENTONS Durham Jones Pinegar

(57)          ABSTRACT

An alignment tool for a solder machine includes a base portion, a bracket and a solder wire alignment portion. Each portion is moveable with respect to the other portions. The base portion includes a laser alignment hole provided on a slope that extends from the base portion. The laser alignment hole is used to align the alignment tool to a laser of the solder machine. A solder wire feeder alignment slot of the solder wire alignment portion is used to align the bracket and the solder wire alignment portion with a solder wire feeder of the solder machine. When each portion of the alignment tool is in a desired position, fasteners of the alignment tool are tightened to secure each portion in the desired position. The alignment tool mirrors a correct alignment between the laser and the solder wire feeder and is usable for subsequent solder machine alignment processes.

20 Claims, 9 Drawing Sheets

100

120

130

170

110

140

150

170

800

810
COMPLETE INITIAL ALIGNMENT OF SOLDER WIRE FEEDER AND LASER OF SOLDER MACHINE

820
LOOSEN FASTENERS OF ALIGNMENT TOOL

830
ALIGN LASER ALIGNMENT HOLE OF ALIGNMENT TOOL TO LASER POINTER OF SOLDER MACHINE

840
ALIGN SOLDER WIRE FEEDER ALIGNMENT SLOT TO SOLDER WIRE FEEDER

850
TIGHTEN FASTENERS ON BASE PORTION, BRACKET AND SOLDER WIRE ALIGNMENT PORTION

900

910
MOVE SOLDER WIRE FEEDER AWAY
FROM LASER

920
ALIGN LASER ALIGNMENT HOLE OF
ALIGNMENT TOOL WITH LASER POINTER

930
POSITION SOLDER WIRE FEEDER UNTIL
IT IS RECEIVED IN SOLDER WIRE
FEEDER ALIGNMENT SLOT

940
SECURE SOLDER WIRE FEEDER IN
POSITION

ALIGNMENT TOOL FOR A SOLDER MACHINE

BACKGROUND

Laser soldering is a soldering process in which a laser is used to heat and melt solder material. When the solder material is melted, it creates a bond between various electronic components and a printed circuit board (PCB) on which the electronic components are placed. As part of the soldering process, solder wire is dispensed from a solder wire feeder and is aligned with the laser.

Over time, the laser and the solder wire feeder may become misaligned. As such, the laser does not contact that solder wire, which prevents the solder wire from melting. The misalignment may cause solder wire to be wasted and/or may cause the PCB to be rejected during inspection and/or testing. Additionally, if the laser and the solder wire feeder are misaligned, the laser may cause damage to the PCB.

Currently, the alignment of the solder wire feeder and the laser is achieved through a trial and error process. For example, the solder wire feeder is moveable in X, Y and Z directions. When misalignment occurs, each of the X, Y, and Z directions of the solder wire feeder must be adjusted and corrected through a trial and error process until alignment is achieved. This alignment process is time consuming and labor intensive and can take a day or more to complete. Once alignment is achieved, the solder machine is continuously monitored for another period of time (up to two weeks) to ensure that the alignment is maintained and/or to make minor adjustments.

Accordingly, it would be beneficial to increase the ease and speed at which a solder wire feeder and a laser of a solder machine are aligned.

SUMMARY

The present application describes an alignment tool for a solder machine. The alignment tool includes three portions—a base portion, a bracket and a solder wire alignment portion. Each portion of the alignment tool is moveable with respect to the other portions. As such, the alignment tool enables four degrees of freedom when configuring the alignment tool for a subsequent solder machine alignment process.

When the laser and solder wire feeder are initially aligned, a laser alignment hole of the base portion is aligned with a laser pointer associated with the laser. A solder wire feeder alignment slot of the solder wire alignment portion is aligned with the solder wire feeder. When each portion of the alignment tool is in the desired position, one or more fasteners (e.g., one or more screws) are tightened to secure each portion of the alignment tool in the desired position. The alignment tool now mirrors the correct alignment between the laser and the solder wire feeder.

Should the solder wire feeder and laser become misaligned, the alignment tool is used during an alignment process. For example, the laser alignment hole of the base portion of the alignment tool is aligned with the laser pointer. Additionally, the solder wire feeder is moved in X, Y and/or Z directions until the solder wire feeder is aligned with the solder wire feeder slot. A solder wire feeder adjustment mechanism is then tightened and the solder wire feeder and the laser are aligned.

Accordingly, examples of the present disclosure describe a solder machine alignment tool that includes a base portion, a bracket and a solder wire alignment portion. In an example, a slope extends from at least a first portion of a top surface of the base portion and defines a laser alignment hole. The bracket is moveably coupled to a second portion of the top surface of the base portion. Additionally, the solder wire alignment portion is moveably coupled to the bracket. The solder wire alignment portion defines a solder wire feeder alignment slot.

Additional examples describe a method that includes aligning a laser alignment hole of a solder machine alignment tool to a laser of a solder machine. In an example, the laser alignment hole is defined by a slope that extends from a base portion of the solder machine alignment tool. The method also includes aligning a solder wire feeder alignment slot to a solder wire feeder of the solder machine. In an example, the solder wire feeder alignment slot is defined by a solder wire alignment portion of the solder machine alignment tool. The base portion of the solder machine alignment tool is secured to the solder machine and the solder wire alignment portion of the solder machine alignment tool is secured to a bracket of the solder machine alignment tool.

In yet another example, the present disclosure describes an alignment tool that includes a sloped surface extending from a base. In an example, the sloped surface defines a first alignment means. The alignment tool also includes a bracket moveably coupled to the base. A solder wire alignment portion is moveably coupled to the bracket. In an example, the solder wire alignment portion defines a second alignment means. At least a portion of the second alignment means is aligned with the first alignment means.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
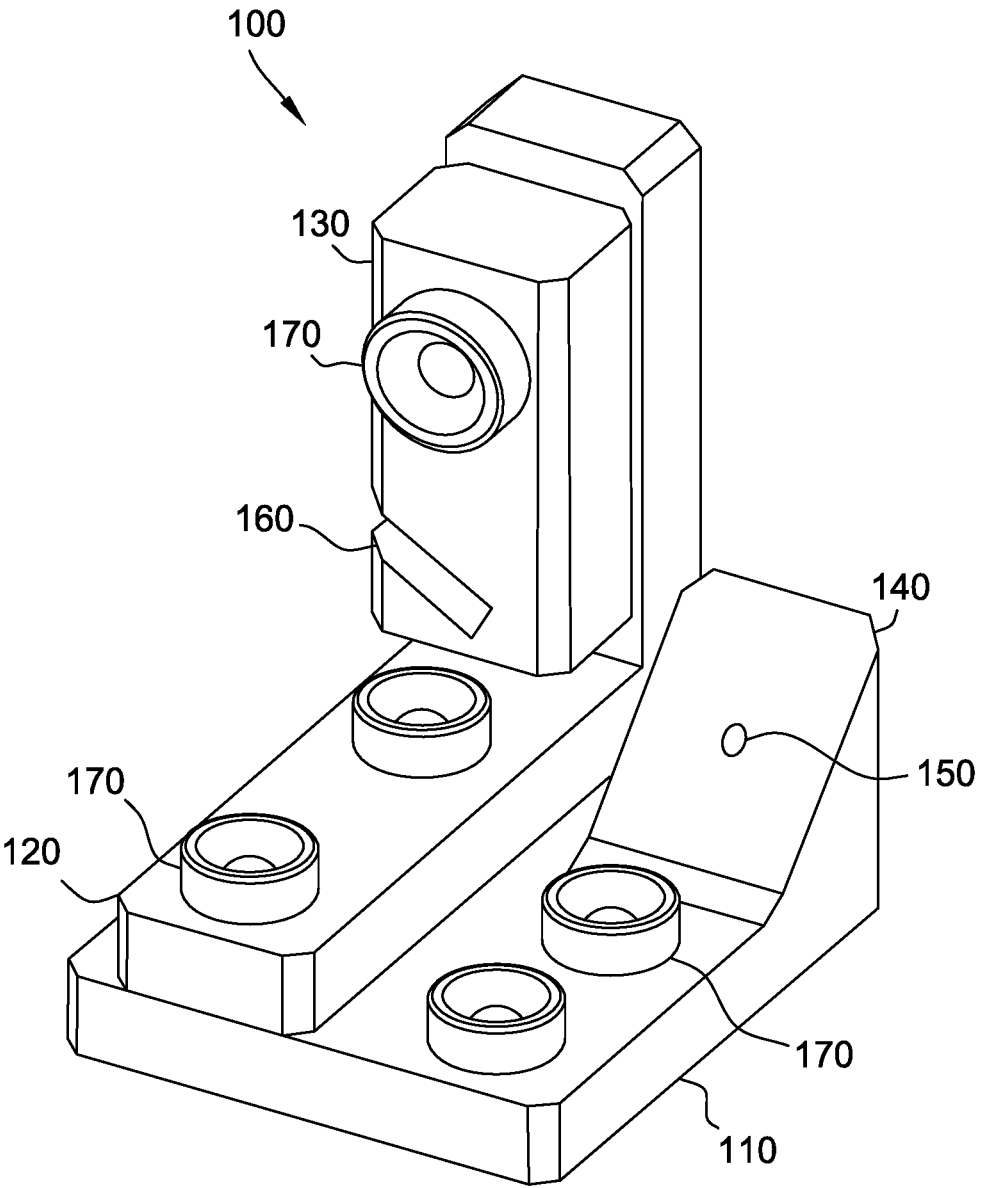
FIG. 1 illustrates a first perspective view an alignment tool according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Various electronic components are typically surface mounted to a printed circuit board (PCB) using a soldering process. For example, in a laser soldering process, a solder wire is dispensed from a solder wire feeder and is placed near an electronic component. A laser is aligned with the solder wire feeder and the solder wire. The laser heats and melts the solder wire thereby creating a bond between the electronic component and the PCB.

However, over time, the laser and the solder wire feeder may become misaligned. As such, the laser does not contact the solder wire which prevents the solder wire from melting. The misalignment may cause solder wire to be wasted and/or may cause the PCB to be rejected during inspection and/or testing. Additionally, if the laser and the solder wire feeder are misaligned, the laser may cause damage to the PCB and/or the electronic components.

Currently, the solder wire feeder and the laser are manually aligned using a trial and error process. For example, the solder wire feeder is moveable in a number of different directions (e.g., X, Y and Z directions). When misalignment occurs, each of the X, Y, and Z directions of the solder wire feeder are adjusted and corrected through a trial and error process until alignment is achieved. As previously indicated, this trial and error process typically takes at least one day to complete. Further, once alignment is achieved, the solder machine is continuously monitored for at least another two weeks to ensure that the alignment is maintained and/or to make minor adjustments to the position of the solder wire feeder.

To address the above, the present application describes an alignment tool for a solder machine. The alignment tool includes three portions—a base portion, a bracket and a solder wire alignment portion. Each portion of the alignment tool is moveable with respect to the other portions. As such, the alignment tool enables four degrees of freedom when configuring the alignment tool for a subsequent solder machine alignment process.

For example, when the laser and solder wire feeder of a solder machine are initially aligned, a laser alignment hole of the base portion of the alignment tool is aligned with a laser pointer (or a laser beam) of the laser. A solder wire feeder alignment slot of the solder wire alignment portion is aligned with the solder wire feeder. When each portion of the alignment tool is in the desired position, one or more fasteners (e.g., one or more screws) is tightened to secure each portion of the alignment tool in the desired position. The alignment tool now mirrors the correct alignment between the laser and the solder wire feeder of the solder machine.

When the solder wire feeder and laser become misaligned, the alignment tool is used to correct/adjust the alignment. For example, the laser alignment hole of the base portion of the alignment tool is aligned with the laser and/or the laser pointer of the solder machine. Additionally, the solder wire feeder is moved in the X, Y and/or Z direction until the solder wire feeder is aligned with the solder wire feeder slot. Once aligned, a solder wire feeder adjustment mechanism is tightened. The solder wire feeder and the laser of the solder machine are now aligned.

Unlike current trial and error alignment processes, the alignment tool is easy to configure. In some examples, the alignment tool can be configured in five minutes or less. Further, once the alignment tool is configured, the alignment tool can align the laser and solder wire feeder in approximately ten minutes (versus current solutions which may require a day).

Accordingly, many technical benefits may be realized including, but not limited to, reducing a downtime of a solder machine thereby increasing the efficiency of the solder machine, increasing a yield of the solder machine, and minimizing the amount of time required to align components of a solder machine.

These and other examples will be shown and described in greater detail with respect to FIG. 1-FIG. 9.

FIG. 1 illustrates a first perspective view an alignment tool 100 according to an example. In an example, the alignment tool 100 includes three portions-a base portion 110, a bracket 120 and a solder wire alignment portion 130. Each portion is moveable with respect to the other portions.

For example, the base portion 110 is moveable in a X direction and a Y direction with respect to a solder machine platform on which the alignment tool 100 is placed. The bracket 120 is moveable in a X direction and a Y direction with respect to the base portion 110. Additionally, the solder wire alignment portion 130 is moveable in a X direction and a Z direction with respect to the bracket 120. The solder wire alignment portion 130 is also rotatable around an axis associated with the bracket 120. Thus, the alignment tool 100 enables four degrees of freedom or movement during an alignment tool 100 configuration process.

In an example, the base portion 110 includes a slope 140 that extends from at least a portion of a top surface of the base portion 110. The slope has an angle of at least forty-five degrees, although other angles are contemplated.

The slope 140 defines a laser alignment hole 150. In an example, the laser alignment hole 150 extends through the slope 140 and the base portion 110. In another example, the laser alignment hole 150 partially extends through the slope 140 and/or the base portion 110. As will be described in greater detail with respect to FIG. 7, when the alignment tool 100 is placed on a platform of a solder machine, the laser alignment hole 150 is aligned with a laser (or a laser pointer) of the solder machine. In an example, the angle or configuration of the slope 150 enables an individual to see whether the laser (or the laser pointer) is aligned with the laser alignment hole 150.

The bracket 120 is moveably coupled to the top surface of the base portion 110. In an example, the bracket 120 has an "L" shape, although other shapes are contemplated. In such a configuration, a bottom portion (or a first portion) of the bracket 120 is moveably coupled to the top surface of the base portion 110 and a top portion (or a second portion) of the bracket 120 extends upward from the bottom portion.

In an example, a length of the bottom portion of the bracket 120 is similar to a length of the base portion 110. In another example, the length of the bottom portion of the bracket 120 is greater than the length of the base portion 110. As such, at least a portion of the bottom portion of the bracket 120 may extend beyond the top surface of the base portion 110.

The solder wire alignment portion 130 is moveably coupled to the bracket 120. For example, the solder wire alignment portion 130 is moveably coupled to a front surface of the top portion of the bracket 120. The solder wire alignment portion 130 defines a solder wire feeder alignment slot 160.

In an example, the solder wire feeder alignment slot 160 is a channel that is shaped and/or sized to receive at least a portion of a solder wire feeder. Additionally, the solder wire feeder alignment slot 160 is positioned at an angle and extends at least partially from a first side of the solder wire alignment portion 130 toward a second side of the solder wire alignment portion 130. In an example, the solder wire feeder alignment slot 160 is aligned, or is moveable to be aligned, with the laser alignment hole 150 of the slope 140.

In an example, the solder wire alignment portion 130 has a height. The height of the solder wire alignment portion 130 may be similar to the height of the top portion of the bracket 120. In another example, the height of the solder wire alignment portion 130 is less than the height of the top portion of the bracket 120. As such, the solder wire alignment portion 130 may be rotatable about an axis (e.g., about an axis of a fastener 170) of the top portion of the bracket 120.

The alignment tool 100 also includes a number of fasteners 170. In an example, the fasteners 170 are screws or other fastening mechanisms/devices. The fasteners 170 are used to secure each portion of the alignment tool 100 in particular positions with respect to the other portions. For example, each portion of the alignment tool 100 may define or otherwise be associated with one or more apertures or holes. A fastener 170 may be provided in each aperture or hole.

For example, a first set of fasteners 170 are provided in various apertures defined by the base portion 110. The first set of fasteners 170 are used to secure the base portion 110 at a particular location/orientation on a platform of a laser solder machine. A second set of fasteners 170 are provided in various apertures defined by the bracket 120. The second set of fasteners 170 are used to secure the bracket 120 in a particular position/orientation with respect to the base portion 110. A third fastener 170 is provided in an aperture defined by the solder wire alignment portion 130. The third fastener 170 is used to secure the solder wire alignment portion 130 at a particular location/orientation with respect to the bracket 120.

Each fastener 170 may change between a first state and a second state. For example, when in a first state (e.g., a loose state), the fasteners 170 enable each portion of the alignment tool 100 to be moved in a variety of directions. However, when the fasteners 170 are in a second state (e.g., a tightened state), each portion of the alignment tool 100 is prohibited from moving. As such, the fasteners 170 enable the alignment tool 100 to be configured for an alignment process while in the first state and enable the alignment tool 100 to be used for the alignment process when in the second state. In an example, a special tool is used to change the state of the fasteners 170.

FIG. 2-FIG. 6 illustrate various different views of the alignment tool 100 shown and described with respect to FIG. 1. These figures include similar reference numbers for clarity and consistency but may be omitted from the description. In such cases, the reference number are used for reference purposes and function in a similar manner as described with respect to FIG. 1.

Figure 2:
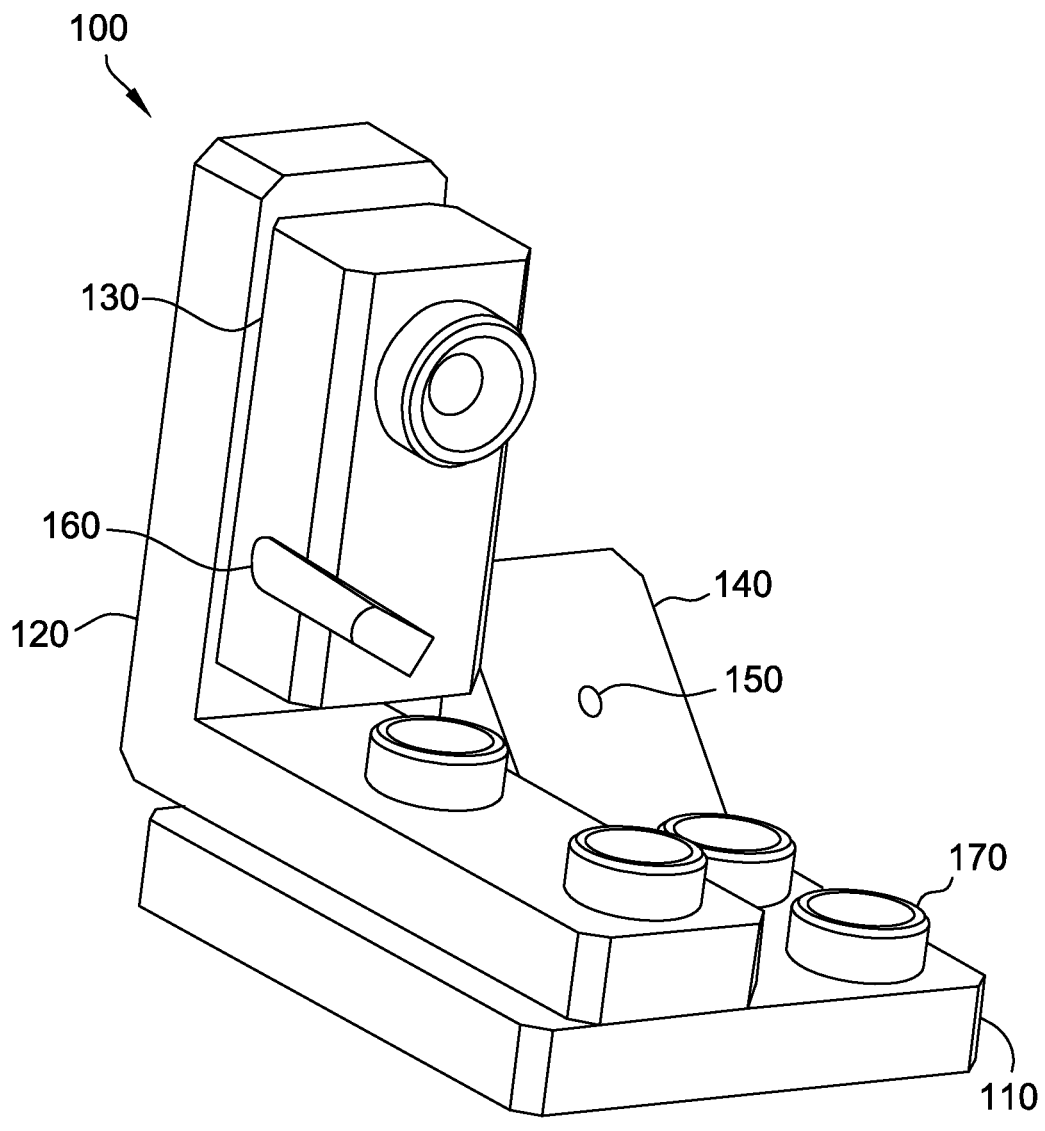
FIG. 2 illustrates a second perspective view of the alignment tool of FIG. 1 according to an example.

FIG. 2 illustrates a second perspective view of the alignment tool 100 of FIG. 1 according to an example. As shown in FIG. 2, the solder wire feeder alignment slot 160 extends from a first side of the solder wire alignment portion 130 toward the laser alignment hole 150 on the slope 140 of the base portion 110. In an example, at least a portion (e.g., a rear portion) of the bracket 120 extends beyond the top surface of the base portion 110 (although this is not required).

Figure 3:
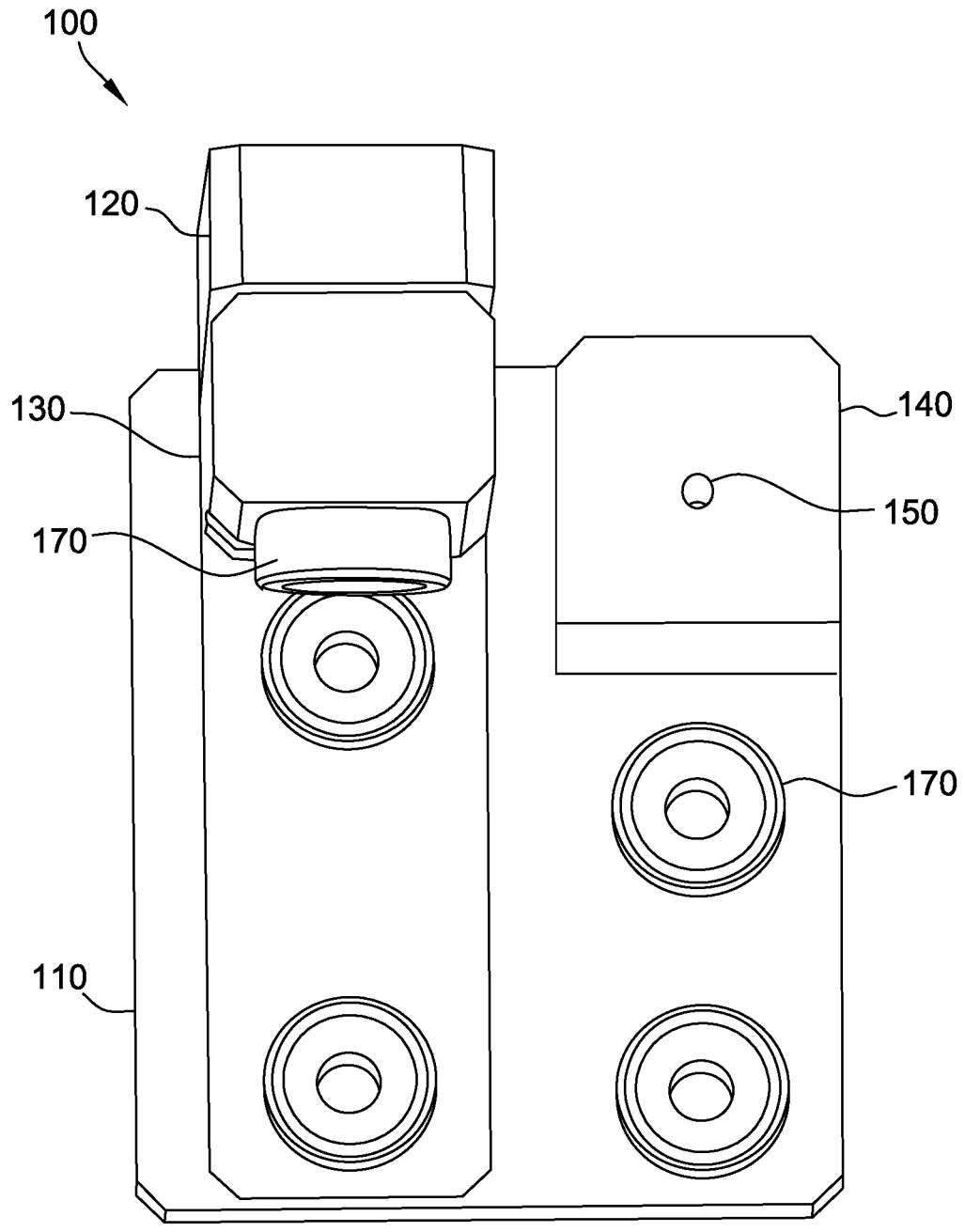
FIG. 3 illustrates a top view of the alignment tool of FIG. 1 according to an example.

FIG. 3 illustrates a top view of the alignment tool 100 of FIG. 1 according to an example. As shown in FIG. 3, the solder wire alignment portion 130 is substantially aligned with the slope 140 of the base portion 110. As such, the solder wire feeder alignment slot 160 can be aligned with the laser alignment hole 150.

In an example, a head or a top portion of the fastener 170 is larger than the aperture in which the fastener is placed. As such, when the fastener 170 is tightened, the head of the fastener 170 contacts the top surface of the particular portion of the alignment tool 100 on which it is placed. This helps secure the particular portion of the alignment tool 100 in the desired position.

Figure 4:
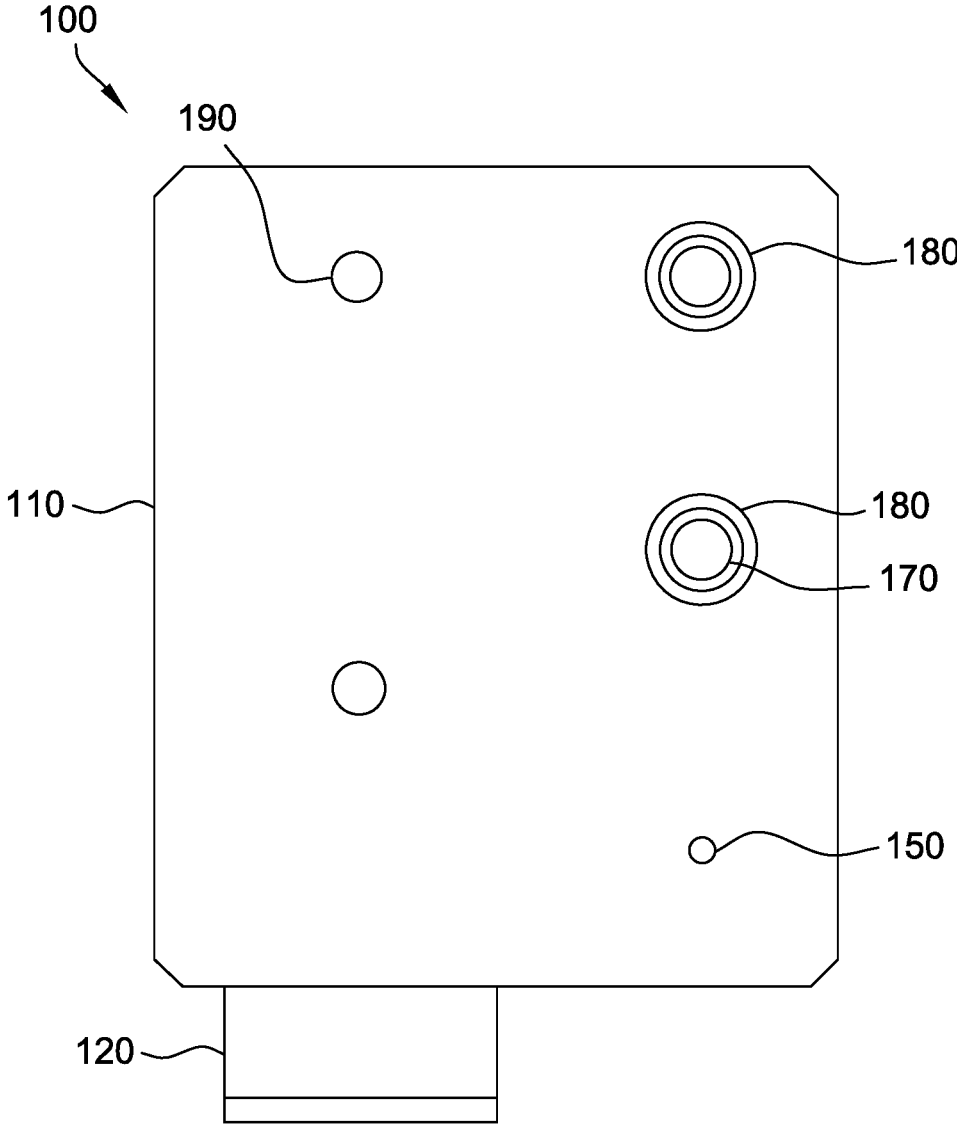
FIG. 4 illustrates a bottom view of the alignment tool of FIG. 1 according to an example.

FIG. 4 illustrates a bottom view of the alignment tool 100 of FIG. 1 according to an example. As previously described, each portion of the alignment tool 100 includes a number of different apertures 180 for receiving a fastener 170. For example, the base portion 110 includes a first set of apertures 180 for receiving a first set of fasteners 170.

In an example, each of the fasteners 170 has a first diameter and each of the first set of apertures 180 has a second diameter that is larger than the first diameter. In an example, the same is true for the apertures in the bracket 120 and for the aperture in the solder wire alignment portion 130. Thus, even when the fasteners 170 are placed in the various apertures 180, each portion of the alignment tool 100 may be moveable in a variety of different directions.

However, each aperture 180 may also be associated with a fastener hole 190. In an example, the fastener hole 190 is a screw tapped hole and receives at least a portion of a screw that is associated with the fastener 170. The fastener hole 190 is aligned with the various other apertures defined by each portion. For example, as shown in FIG. 4, one or more fastener holes 190 are defined by the base portion 110 and are aligned with the apertures of the bracket 120. As such, the fastener holes 190 may receive at least a portion of the fastener 170, thereby enabling the fastener 170 to securely hold the bracket 120 (or other associated portions) in a desired position.

Figure 5:
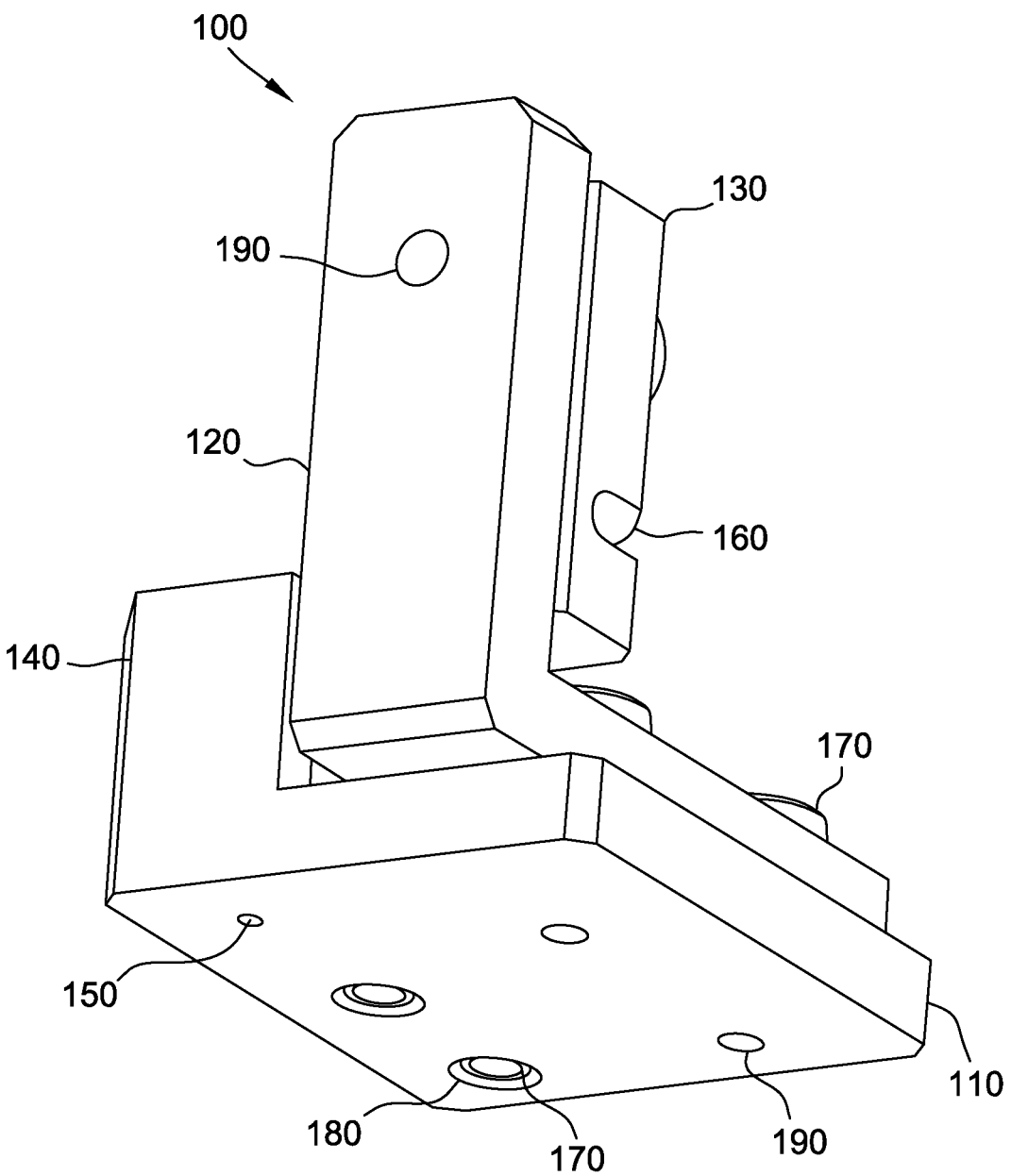
FIG. 5 illustrates a back perspective view of the alignment tool of FIG. 1 according to an example.

FIG. 5 illustrates a back perspective view of the alignment tool 100 of FIG. 1 according to an example. In the example shown in FIG. 5, the bracket 120 includes at least one fastener hole 190 that is aligned with an aperture defined by the solder wire alignment portion 130. As such, at least a portion of the fastener 170 provided in the aperture defined by the solder wire alignment portion 130 may be received by the fastener hole 190 defined by the bracket 120.

Figure 6:
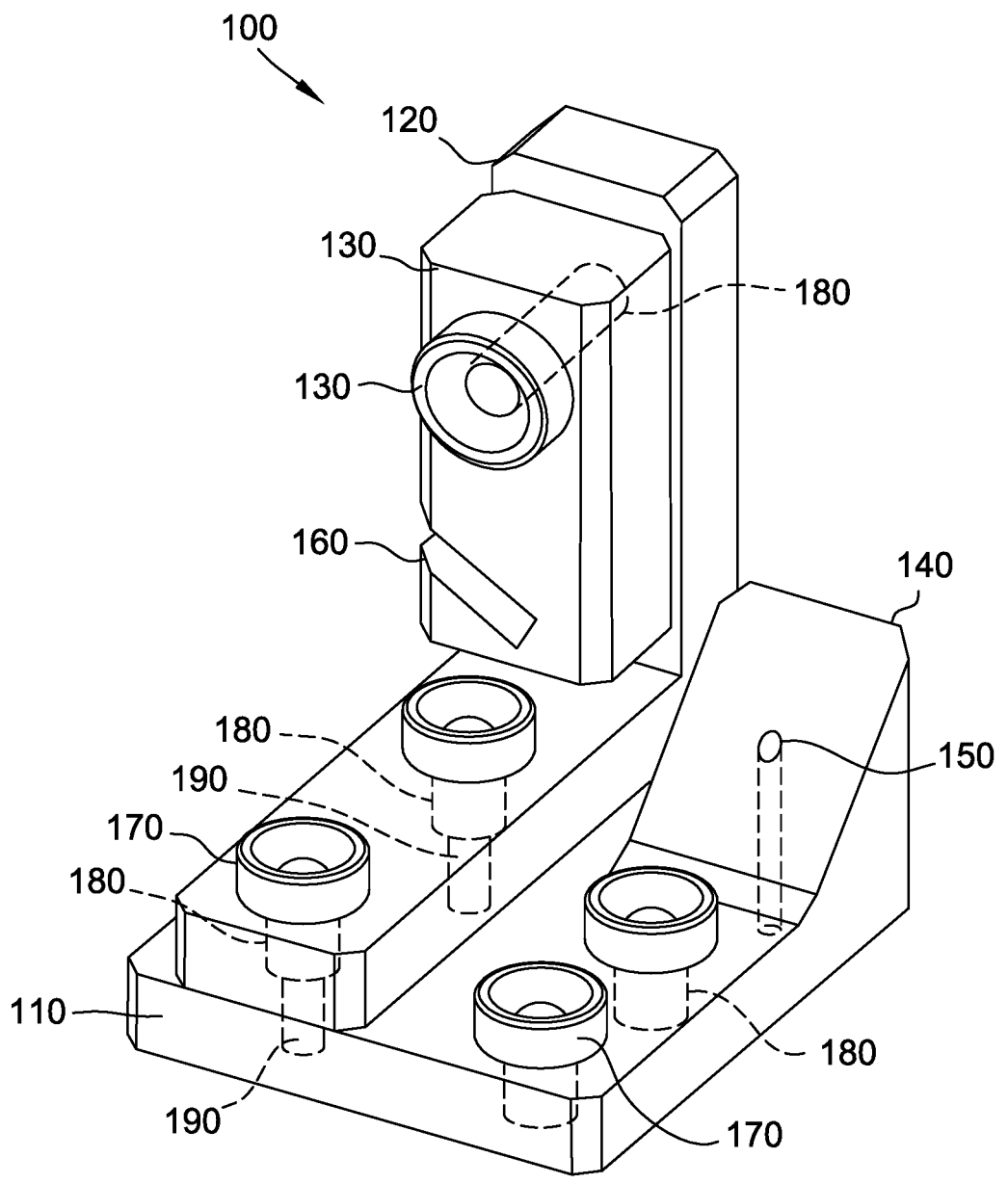
FIG. 6 illustrates another perspective view of the alignment tool of FIG. 1 according to an example.

FIG. 6 illustrates another perspective view of the alignment tool 100 of FIG. 1 according to an example. In the example shown in FIG. 6, the base portion 110 includes a first set of apertures 180 for receiving at least a portion of a first set of fasteners 170. Likewise, the bracket 120 defines or otherwise includes a second set of apertures 180 for receiving a second set of fasteners 170. Additionally, the solder wire alignment portion 130 defines or includes an aperture 180 for receiving at least a portion of the fastener 170. In each example, a diameter of the aperture 180 is larger than the diameter of the portion of the fastener 170 that is received in the aperture 180. As such, each portion of the alignment tool 100 may move in a variety of different directions when the fasteners 170 are disposed with the apertures 180 but are not tightened.

FIG. 6 also illustrates how various fasteners holes 190 are aligned with various apertures 180. In an example, the fastener holes 190 have a diameter that is smaller than the diameter of the apertures 180 and/or a diameter of at least a portion of the fasteners 170.

As also shown in FIG. 6, the laser alignment hole 150 may extend entirely through the slope 140 of the base portion.

However, this is not required and the laser alignment hole 150 may partially extend through the slope 140 and/or the base portion 110.

Figure 7:
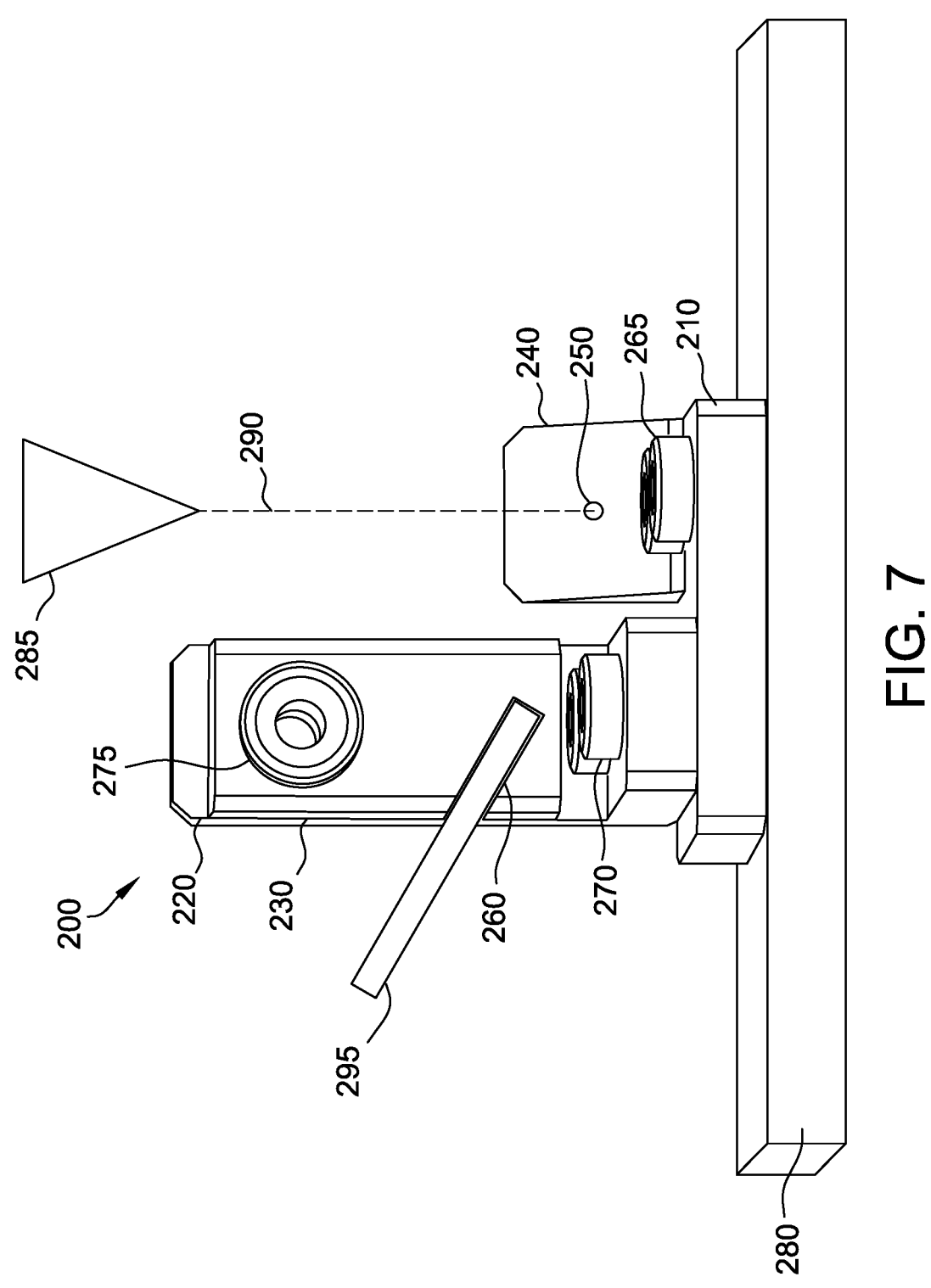
FIG. 7 illustrates an alignment tool being coupled to a solder machine according to an example.

FIG. 7 illustrates an alignment tool 200 being coupled to a solder machine according to an example. In an example, the alignment tool 200 is similar to the alignment tool 100 shown and described with respect to FIG. 1-FIG. 6. Additionally, in this example, the alignment tool 200 is being configured for an alignment process. As such, the various fasteners associated with each portion of the alignment tool 200 are in a first state (e.g., the fasteners are loose), which enables each portion of the alignment tool 200 to be moveable with respect to the other portions. Additionally, a solder wire feeder 295 of the solder machine has been properly aligned with a laser 285 of the solder machine.

In an example, the alignment tool 200 includes a base portion 210, a bracket 220 and a solder wire alignment portion 230. The base portion 210 is positioned on, or otherwise coupled to a platform 280 of a solder machine.

The base portion may be moved/positioned on the platform until a laser alignment hole 250 defined by a slope 240 that extends from the base portion 210 is aligned with a laser pointer 290 (or a laser beam) associated with the laser 285. In an example, the slope 240 enables visual confirmation that the laser alignment hole 250 is aligned with the laser pointer 290.

In an example, when the laser alignment hole 250 is aligned with the laser pointer 290, a first set of fasteners 265 are tightened (e.g., the fasteners 265 are moved from a first state to a second state) to secure the base portion 210 at the desired/determined position/location on the platform 280. In another example, the first set of fasteners 265 are not tightened until all portions of the alignment tool 200 are in the desired/determined position/location.

The bracket 220 and/or the solder wire alignment portion 230 are then moved and/or positioned such that the solder wire feeder 295 is received in a solder wire feeder alignment slot 260 of the solder wire alignment portion. In an example, a distal end of the solder wire feeder 295 should be adjacent to, or should contact, a distal end of the solder wire feeder alignment slot 260 to help ensure the solder wire alignment portion 230 is properly positioned. Additionally, one or more sidewalls of the solder wire feeder 295 may contact one or more sidewalls of the solder wire feeder alignment slot. Once this has occurred, a second set of fasteners 270 and the third fastener 275 are tightened (or are moved from the first state to the second state) which secures the positions of the bracket 220 and the solder wire alignment portion 230.

In this example, the alignment tool 200 is now usable in any subsequently solder machine alignment process as the solder wire feeder alignment slot 260 is properly aligned with the laser alignment hole 250. Thus, if the solder wire feeder 295 and the laser 285 become misaligned, the alignment tool 200 is used to quickly and efficiently align the solder wire feeder 295 with the laser 285.

For example, if the solder wire feeder 295 and the laser 285 become misaligned, the solder wire feeder 295 is configured such that it is moveable in the X, Y and/or Z directions. The alignment tool 200 may then be placed on the platform 280 of the solder machine and the laser alignment hole 250 is aligned with the laser pointer 290. The first set of fasteners 265 may be tightened to secure the alignment tool 200 to the platform 280.

The solder wire feeder 295 is then moved and/or positioned such that it is received into the solder wire feeder alignment slot 260. A solder wire feeder adjustor may then be tightened to secure the solder wire feeder 295 at the appropriate position (e.g., a position at which the solder wire feeder 295 is aligned with the laser 285) within the solder wire feeder alignment slot 260.

Figure 8:
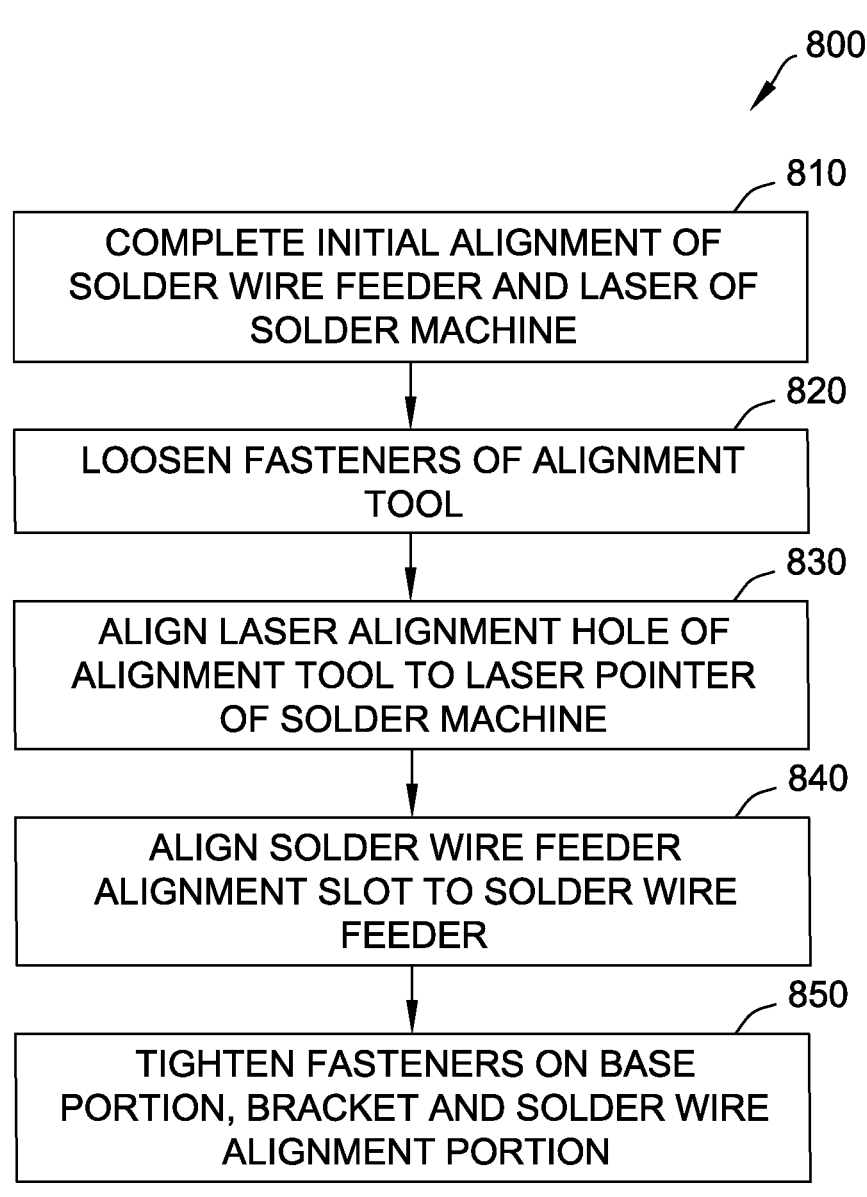
FIG. 8 illustrates a method for configuring an alignment tool according to an example.

FIG. 8 illustrates a method 800 for configuring an alignment tool according to an example. In an example, the method 800 may be performed on an alignment tool, such as, for example, the alignment tool 100 shown and described with respect to FIG. 1-FIG. 6 and/or the alignment tool 200 shown and described with respect to FIG. 7.

Method 800 begins when an initial alignment process of a solder machine has been completed (810). In an example, the initial alignment process is a process in which a solder wire feeder of the solder machine has been aligned with a laser of the solder machine.

Once the initial alignment of the solder machine is complete, one or more fasteners of the alignment tool are loosened (820) (presuming the fasteners were in a tightened state). In an example, the alignment tool includes at least three portions and each portion includes one or more fasteners. For example, the alignment tool includes a base portion, a bracket and a solder wire alignment portion and each portion includes at least one fastener. When the fasteners are in a first state (or in a loosened state), each portion is moveable relative to the other portions of the alignment tool.

The base portion is then moved/positioned on a platform of the solder machine until a laser alignment hole of the base portion of alignment tool is aligned (830) with a laser pointer (or a laser beam) associated with the laser of the solder machine. When the laser pointer is aligned with the laser alignment hole, a solder wire feeder alignment slot is aligned (840) with the solder wire feeder.

In an example, the solder wire feeder alignment slot is defined by the solder wire alignment portion. As such, the bracket and/or the solder wire alignment portion are moved and/or positioned in an X, Y, Z, and/or about an axis until that the solder wire feeder is received within the solder wire feeder alignment slot.

Once this has occurred, a first set of fasteners associated with the base portion are tightened (850), followed by a second set of fasteners associated with the bracket and a third fastener associated with the solder wire alignment portion. As previously explained, the alignment tool is now usable in any subsequent solder machine alignment process as the solder wire feeder alignment slot is properly aligned with the laser alignment hole.

Figure 9:
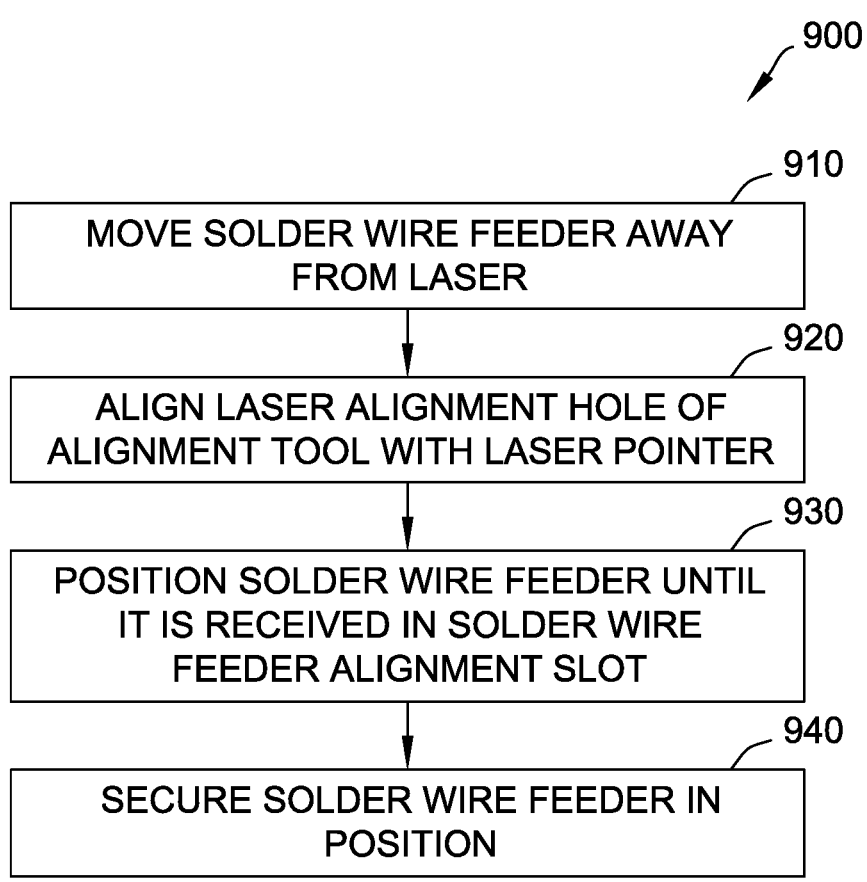
FIG. 9 illustrates a method for using an alignment tool to align components of a solder machine according to an example.

FIG. 9 illustrates a method 900 for using an alignment tool to align components of a solder machine according to an example. In an example, the method 900 may be performed using an alignment tool, such as, for example, the alignment tool 100 shown and described with respect to FIG. 1-FIG. 6 and/or the alignment tool 200 shown and described with respect to FIG. 7.

Method 900 begins when a solder wire feeder of a solder machine has become misaligned from a laser of the solder machine. In such an example, the solder wire feeder is moved (910) away from the laser. In an example, the solder wire feeder includes an adjustment mechanism that enables the solder wire feeder to move in X, Y and/or Z directions.

The alignment tool is then placed on a platform of the solder machine and a laser alignment hole of the alignment tool is aligned (920) to a laser pointer associated with a laser of the solder machine. In an example, a first set of fasteners on a base portion of the alignment tool are tightened to secure the alignment tool to the platform and to secure the alignment tool at a desired location/position.

The solder wire feeder is then positioned (930) and/or moved such that the solder wire feeder is received into a solder wire feeder alignment slot of the alignment tool. A solder wire feeder adjustor is then tightened to secure (940) the solder wire feeder at the appropriate position (e.g., a position at which the solder wire feeder is aligned with the laser).

Examples of the present disclosure describe a solder machine alignment tool, comprising: a base portion; a slope extending from at least a first portion of a top surface of the base portion, the slope defining a laser alignment hole; a bracket moveably coupled to a second portion of the top surface of the base portion; and a solder wire alignment portion moveably coupled to the bracket, the solder wire alignment portion defining a solder wire feeder alignment slot. In an example, the base portion includes at least one fastener to secure the base portion to a platform of a solder machine. In an example, the base portion defines at least one aperture that receives the at least one fastener and wherein the at least one aperture has a first diameter and the at least one fastener has a second diameter that is smaller than the first diameter. In an example, the base portion is moveable in multiple directions with respect to the platform when the at least one fastener is in a first state and wherein the base portion is secured at a particular position with respect to the platform when the at least one fastener is in a second state. In an example, the bracket includes at least one fastener to secure the bracket to the base portion. In an example, the bracket defines at least one aperture that receives the at least one fastener and wherein the at least one aperture has a first diameter and the at least one fastener has a second diameter that is smaller than the first diameter. In an example, the bracket is moveable in multiple directions with respect to the base portion when the at least one fastener is in a first state and wherein the bracket is secured at a particular position with respect to the base portion when the at least one fastener is in a second state. In an example, the solder wire alignment portion includes at least one fastener to secure the solder wire alignment portion to the bracket. In an example, the solder wire alignment portion defines at least one aperture that receives the at least one fastener and wherein the at least one aperture has a first diameter and the at least one fastener has a second diameter that is smaller than the first diameter. In an example, the solder wire alignment portion is rotatable around an axis of the at least one fastener. In an example, the solder wire alignment portion is moveable in multiple directions with respect to the bracket when the at least one fastener is in a first state and wherein the solder wire alignment portion is secured at a particular position with respect to the bracket when the at least one fastener is in a second state. In an example, the solder wire feeder alignment slot is aligned with the laser alignment hole.

Other examples describe a method, comprising: aligning a laser alignment hole of a solder machine alignment tool to a laser of a solder machine, the laser alignment hole defined by a slope that extends from a base portion of the solder machine alignment tool; aligning a solder wire feeder alignment slot to a solder wire feeder of the solder machine, the solder wire feeder alignment slot defined by a solder wire alignment portion of the solder machine alignment tool; securing the base portion of the solder machine alignment tool to the solder machine; and securing the solder wire alignment portion of the solder machine alignment tool to a bracket of the solder machine alignment tool. In an example, the method also includes securing the bracket of the solder machine alignment tool to the base portion of the solder machine alignment tool. In an example, a set of screws secures the base portion of the solder machine alignment tool to the solder machine and wherein at least one screw secures the solder wire alignment portion of the solder machine alignment tool to the bracket of the solder machine alignment tool. In an example, the bracket is moveable in a plurality of directions with respect to the base portion and wherein the solder wire alignment portion is moveable in a plurality of directions with respect to the bracket. In an example, the solder machine alignment tool includes a plurality of screws and wherein at least one of the plurality of screws is loosened prior to aligning the laser alignment hole of the solder machine alignment tool to the laser of the solder machine.

Additional examples describe an alignment tool, comprising: a sloped surface extending from a base, the sloped surface defining a first alignment means; a bracket moveably coupled to the base; and a solder wire alignment portion moveably coupled to the bracket, the solder wire alignment portion defining a second alignment means, wherein at least a portion of the second alignment means is aligned with the first alignment means. In an example, the alignment tool also includes a plurality of fastening means for securing the bracket in a particular position with respect to the base and for securing the solder wire alignment portion in a particular position with respect to the bracket. In an example, the first alignment means is associated with a laser of a solder machine and wherein the second alignment means is associated with a solder wire feeder of the solder machine.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A solder machine alignment tool, comprising:
a base portion;
a slope extending from at least a first portion of a top surface of the base portion, the slope defining a laser alignment hole;
a bracket moveably coupled to a second portion of the top surface of the base portion; and
a solder wire alignment portion moveably coupled to the bracket, the solder wire alignment portion defining a solder wire feeder alignment slot.

2. The solder machine alignment tool of claim 1, wherein the solder wire feeder alignment slot is aligned with the laser alignment hole.

3. The solder machine alignment tool of claim 1, wherein the base portion includes at least one fastener to secure the base portion to a platform of a solder machine.

4. The solder machine alignment tool of claim 3, wherein the base portion defines at least one aperture that receives the at least one fastener and wherein the at least one aperture has a first diameter and the at least one fastener has a second diameter that is smaller than the first diameter.

5. The solder machine alignment tool of claim 3, wherein the base portion is moveable in multiple directions with respect to the platform when the at least one fastener is in a first state and wherein the base portion is secured at a particular position with respect to the platform when the at least one fastener is in a second state.

6. The solder machine alignment tool of claim 1, wherein the bracket includes at least one fastener to secure the bracket to the base portion.

7. The solder machine alignment tool of claim 6, wherein the bracket defines at least one aperture that receives the at least one fastener and wherein the at least one aperture has a first diameter and the at least one fastener has a second diameter that is smaller than the first diameter.

8. The solder machine alignment tool of claim 6, wherein the bracket is moveable in multiple directions with respect to the base portion when the at least one fastener is in a first state and wherein the bracket is secured at a particular position with respect to the base portion when the at least one fastener is in a second state.

9. The solder machine alignment tool of claim 1, wherein the solder wire alignment portion includes at least one fastener to secure the solder wire alignment portion to the bracket.

10. The solder machine alignment tool of claim 9, wherein the solder wire alignment portion defines at least one aperture that receives the at least one fastener and wherein the at least one aperture has a first diameter and the at least one fastener has a second diameter that is smaller than the first diameter.

11. The solder machine alignment tool of claim 9, wherein the solder wire alignment portion is rotatable around an axis of the at least one fastener.

12. The solder machine alignment tool of claim 9, wherein the solder wire alignment portion is moveable in multiple directions with respect to the bracket when the at least one fastener is in a first state and wherein the solder wire alignment portion is secured at a particular position with respect to the bracket when the at least one fastener is in a second state.

13. A method, comprising:
aligning a laser alignment hole of a solder machine alignment tool to a laser of a solder machine, the laser alignment hole defined by a slope that extends from a base portion of the solder machine alignment tool;
aligning a solder wire feeder alignment slot to a solder wire feeder of the solder machine, the solder wire feeder alignment slot defined by a solder wire alignment portion of the solder machine alignment tool;
securing the base portion of the solder machine alignment tool to the solder machine; and
securing the solder wire alignment portion of the solder machine alignment tool to a bracket of the solder machine alignment tool.

14. The method of claim 13, further comprising securing the bracket of the solder machine alignment tool to the base portion of the solder machine alignment tool.

15. The method of claim 13, wherein a set of screws secures the base portion of the solder machine alignment tool to the solder machine and wherein at least one screw secures the solder wire alignment portion of the solder machine alignment tool to the bracket of the solder machine alignment tool.

16. The method of claim 13, wherein the bracket is moveable in a plurality of directions with respect to the base portion and wherein the solder wire alignment portion is moveable in a plurality of directions with respect to the bracket.

17. The method of claim 13, wherein the solder machine alignment tool includes a plurality of screws and wherein at least one of the plurality of screws is loosened prior to aligning the laser alignment hole of the solder machine alignment tool to the laser of the solder machine.

18. An alignment tool, comprising:
a sloped surface extending from a base, the sloped surface defining a first laser alignment means;
a bracket moveably coupled to the base; and
a solder wire alignment portion moveably coupled to the bracket, the solder wire alignment portion defining a solder wire feeder alignment means, wherein at least a portion of the solder wire feeder alignment means is aligned with the laser alignment means.

19. The alignment tool of claim 18, further comprising a plurality of fastening means for securing the bracket at a first position relative to the base and for securing the solder wire alignment portion at a second position relative to the bracket.

20. The alignment tool of claim 18, wherein the solder wire alignment portion is rotatable about an axis associated with the bracket.

\*　\*　\*　\*　\*